(12) United States Patent
Hopper

(10) Patent No.: US 8,771,544 B2
(45) Date of Patent: Jul. 8, 2014

(54) STAIR TOWER MODULE

(76) Inventor: Larry James Hopper, Soddy Daisy, TN (US)

( * ) Notice: Subject to any disclaimer, the term of this patent is extended or adjusted under 35 U.S.C. 154(b) by 375 days.

(21) Appl. No.: 13/068,289

(22) Filed: May 7, 2011

(65) Prior Publication Data

US 2011/0271613 A1 Nov. 10, 2011

Related U.S. Application Data

(60) Provisional application No. 61/395,211, filed on May 10, 2010.

(51) Int. Cl.
*E04F 11/022* (2006.01)
*E04F 11/02* (2006.01)

(52) U.S. Cl.
CPC .................................... *E04F 11/02* (2013.01)
USPC ...................................................... 252/185

(58) Field of Classification Search
USPC ........... 52/182, 183, 184, 185, 186, 188, 190, 52/191; 182/189, 115, 83
See application file for complete search history.

(56) References Cited

U.S. PATENT DOCUMENTS

| | | | | |
|---|---|---|---|---|
| 3,310,132 A * | 3/1967 | Rolland | ........................ | 182/189 |
| 3,670,848 A * | 6/1972 | Raiguel, Jr. | ................... | 182/115 |
| 3,707,814 A * | 1/1973 | Seegers | .......................... | 52/185 |
| 3,720,024 A * | 3/1973 | Theisen | ......................... | 52/185 |
| 3,859,771 A * | 1/1975 | Simmons et al. | ............ | 52/741.2 |
| 4,315,389 A * | 2/1982 | Loix | ................................ | 52/185 |
| 5,491,939 A * | 2/1996 | Wang | .............................. | 52/185 |
| 7,258,199 B2 * | 8/2007 | Hayes, Sr. | .................. | 182/178.1 |
| 2007/0294955 A1 * | 12/2007 | Sportel | ............................. | 52/40 |
| 2009/0153656 A1 * | 6/2009 | Sharonova | .................... | 348/125 |
| 2009/0284012 A1 * | 11/2009 | Mortensen | ...................... | 290/44 |
| 2010/0095617 A1 * | 4/2010 | Scholte-Wassink | ........... | 52/296 |
| 2011/0173811 A1 * | 7/2011 | Iversen | ....................... | 29/889.1 |
| 2011/0239563 A1 * | 10/2011 | Garcia Maestre et al. | ... | 52/223.5 |

* cited by examiner

*Primary Examiner* — William Gilbert
*Assistant Examiner* — Kyle Walraed-Sullivan
(74) *Attorney, Agent, or Firm* — Kent R. Moore

(57) ABSTRACT

A modular, prefabricated stair tower comprising a plurality of stairs, landings, handrails and hangers pre-assembled into a module configured such that it might be shipped and installed into a wind power tower tube section, with installation preferably occurring prior to shipment to the wind farm jobsite so that, when the tube section is erected vertically, authorized personnel gain immediate, efficient and economical access for ascending and descending large land based and offshore wind power turbine towers.

16 Claims, 17 Drawing Sheets

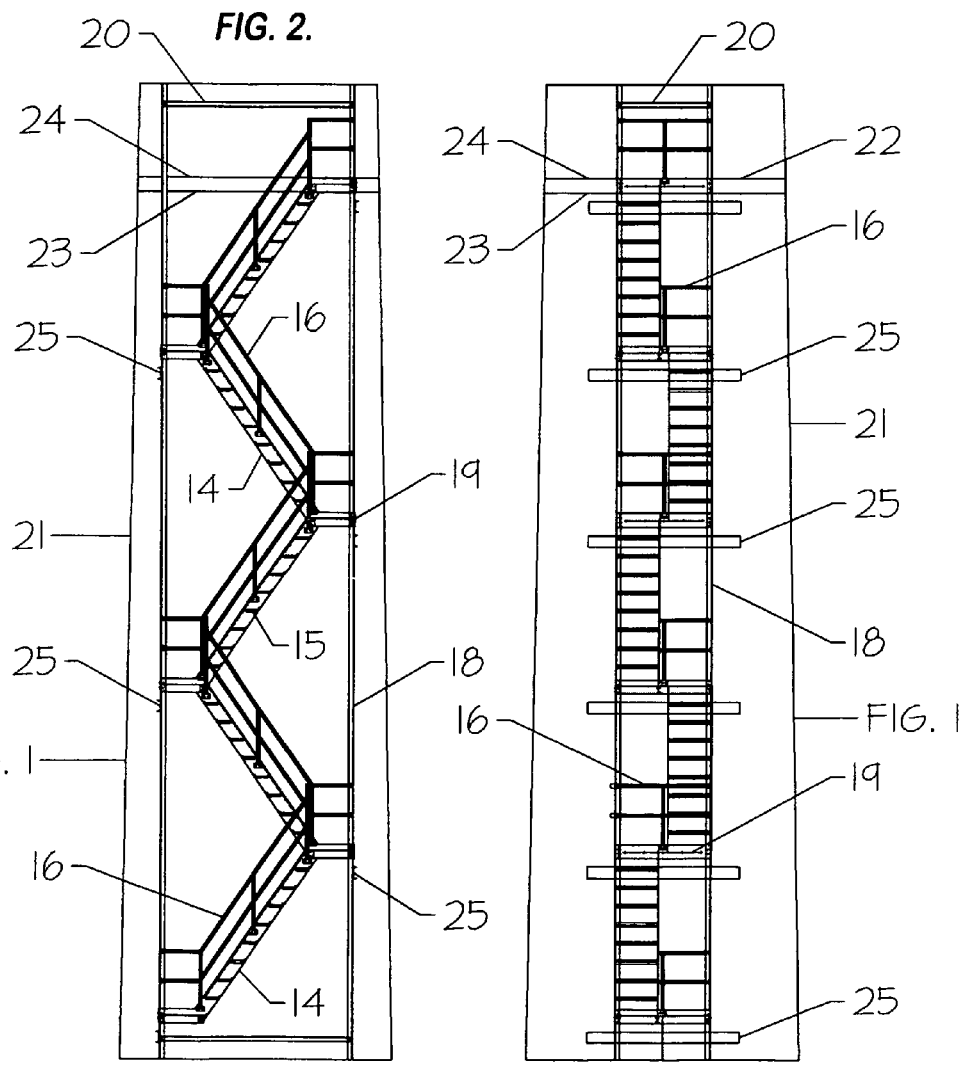

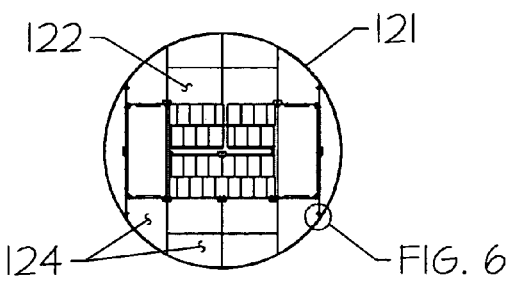
FIG. 14.
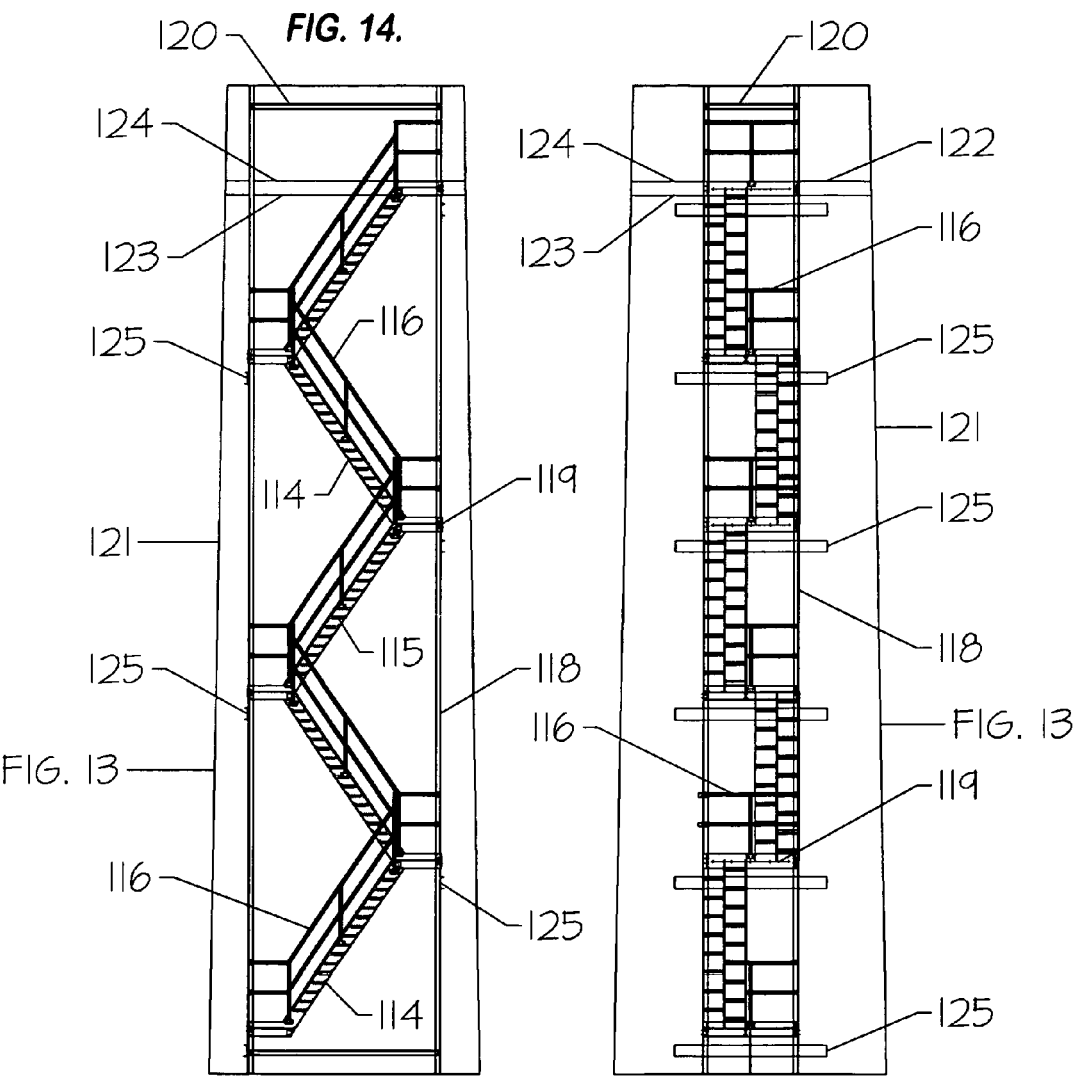
FIG. 15.     FIG. 16.

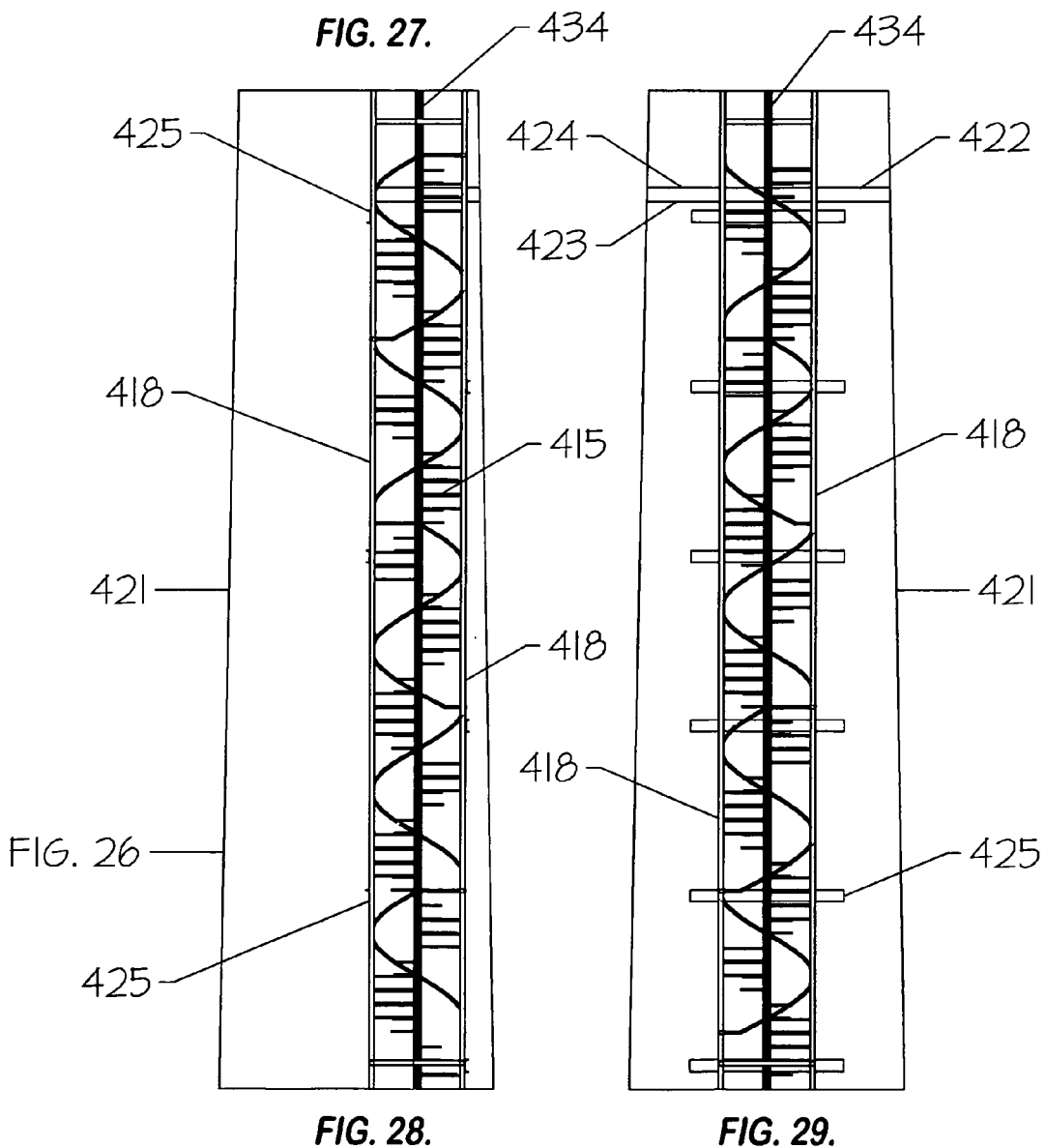

STAIR TOWER MODULE

RELATED APPLICATIONS

This application claims the benefit of U.S. Provisional Application Ser. No. 61/395,211 filed on May 10, 2010.

BACKGROUND OF THE INVENTION

This invention relates to an improved stair tower module and more particularly a stair tower module and system developed for the wind power industry to make wind towers more accessible and improve the efficiency of ingress and egress for authorized personnel.

Existing ingress and egress options available for large wind power tube towers include the open ladder system with fall arrest and the electric lift system. Both of these systems have significant drawbacks because of their significant requirements including, but not limited to, extensive personnel training and certification, special safety equipment such as fall arrest devices, special physical capabilities for personnel, scheduled maintenance requirements and access to electricity. The existing systems limit travel to one person at a time traveling in only one direction at a time making ingress and egress time consuming and inefficient. Those system limitations make emergency response difficult and does not provide for practical emergency exit in case of fire in the top of the wind tower structure.

It is impractical to assemble a conventional stair system inside a horizontal tube; it is also inefficient and expensive to erect stairs inside a vertical tube. The present invention and system allows the stairs to be pre-fabricated into shippable modules at the fabrication plant. The modules are then shipped to the tube manufacture or the jobsite location where they are installed into the tube tower sections while the tube sections are in their horizontal position. Once installed, the tube section can be placed in its vertical position, at the jobsite, giving the workers immediate efficient stair access to accomplish their work in a fraction of the time currently required of the existing system options.

The stair tower module system addresses all the problems associated with the currently available ingress and egress options. No special training or certification is required to access the stair system. As long as authorized personnel stay on the walking surface they are within the guardrails and no special fall arrest devises are required. Further, no special physical capabilities are required of personnel opening up the demographic of people able to access the nacelle (the enclosed top of the wind tower where the majority of the work is performed). Stairs furnished as either hot dipped galvanized steel or a mill finished aluminum, require very little scheduled maintenance throughout the life of the wind tower structure. Unlike an electric lift, the present system does not require electricity making the system available to construction workers as soon as the tube sections are stood up vertically facilitating the installation of the next tower section, nacelle, tower blades and accompanying equipment.

Probably the greatest advantage to the existing stair tower module system is that numerous authorized personnel can utilize the system at the same time, moving in both directions at the same time. Accessible and efficient ingress and egress is absolutely crucial to economically and safely support erection, set-up, maintenance and most importantly emergency response. Stair towers provide the only reasonable way to evacuate workers from the top of tall structures such as wind towers in the case of fire or other emergency exit situations. Cost benefit analysis suggests that the present system could pay for itself much faster than other existing wind tower access systems by reducing the cost of tower installation and future farm operations.

BRIEF SUMMARY OF THE INVENTION

This invention relates to a unique stair tower module, its fabrication, assembly and integration into wind power tube tower sections for primary tower ingress and egress.

It is an object of the present invention to provide stair ingress and egress to allow authorized personnel to efficiently ascend and descend wind tower structures and the like.

Another object of the present invention is to pre-assemble stairs, landings, handrails and hangers into a stair tower module at a shop facility designed to fit inside wind power tower tubes and allow at least two modules to be shipped per truckload.

A still further object of the present invention is to provide a stair tower module where a limited number of structural members serve as the module framing, the intermediate landing handrail corner post and the support hangers for the stair tower module system.

A still further object of the present invention is to provide a stair tower module that is installed into a wind tower tube section by affixing a rubber wheeled dolly to the front leading edge of the module and rolling it inside a tube section with a forklift or crane.

A still further object of the present invention is to provide a stair tower module with intermediate landings that might allow construction workers and other authorized personnel to pass while traveling in both directions inside the wind tower.

A still further object of the present invention is to provide a stair tower module where a minimal number of support members are required to fasten the module to the inside of the tower tube wall.

A still further object of the present invention is to provide a stair tower module that will allow immediate ingress and egress for construction workers as soon as the tower tube section is erected vertically at the wind farm jobsite.

A still further object of the present invention is to provide a stair tower module that improves labor cost to erect and maintain a wind tower by significantly reducing the time required for personnel to travel through the wind tower.

A still further object of the present invention is to provide a stair tower module that expands the demographic of individuals who might be capable of accessing the wind tower including improving access for emergency responders.

BRIEF DESCRIPTION OF THE DRAWINGS

FIG. 2 is a plan view of a stair tower module mounted inside a wind tower tube section.

FIG. 3 is a hidden side elevation view of a typical stair tower module of the present invention mounted inside a wind tower tube section.

FIG. 4 is a hidden end elevation view of a typical stair tower module mounted inside a wind tower tube section.

FIG. 14 is a top view of the embodiment shown in FIG. 13.

FIG. 15 is a right side view of the embodiment shown in FIG. 13, the left side view being a mirror image thereof.

FIG. 16 is an end view of the embodiment shown in FIG. 13.

FIG. 27 is a top view of the embodiment shown in FIG. 26.

FIG. 28 is a right side view of the embodiment shown in FIG. 26, the left side view being a mirror image thereof.

FIG. 29 is an end view of the embodiment shown in FIG. 26.

BRIEF DESCRIPTION OF THE PARTS

First Embodiment

13—stair, 14—stair stringer, 15—stair tread, 16—handrail, 17—intermediate landing, 18—corner hanger, 19—intermediate landing support plate, 20—module support member, 21—wind power tower tube section, 22—work platform, 23—support framing, 24—checkered floor plate, 25—module attachment channel, 26—fastening plate, 27—splice plate, 28—rubber wheeled dolly, 29—mobile crane, 30—track crane, 31—wind tower, 32—nacelle, 33—blades.

Second Embodiment

113—stair, 114—stair stringer, 115—stair tread, 116—handrail, 117—intermediate landing, 118—corner hanger, 119—intermediate landing support plate, 120—module support member, 121—wind power tower tube section, 122—work platform, 123—support framing, 124—checkered floor plate, 125—module attachment channel.

Third Embodiment

213—stair, 214—stair stringer, 215—stair tread, 216—handrail, 217—intermediate landing, 218—corner hanger, 219—intermediate landing support plate, 220—module support member, 221—wind power tower tube section, 222—work platform, 223—support framing, 224—checkered floor plate, 225—module attachment channel.

Fourth Embodiment

313—stair, 314—stair stringer, 315—stair tread, 316—handrail, 317—intermediate landing, 318—corner hanger, 320—module support member, 321—wind power tower tube section, 322—work platform, 323—support framing, 324—checkered floor plate, 325—module attachment channel, 334—Center Support Member.

Fifth Embodiment

413—stair, 414—stair stringer, 415—stair tread, 416—handrail, 417—intermediate landing, 418—corner hanger, 420—module support member, 421—wind power tower tube section, 422—work platform, 423—support framing, 424—checkered floor plate, 425—module attachment channel, 434—Center Support Member, 435—Baluster.

Sixth Embodiment

513—ladder, 514—cage, 516—handrail, 517—intermediate landing, 518—corner hanger, 521—wind power tower tube section.

DETAILED DESCRIPTION

The present invention relates to a stair tower module, it's design, fabrication, assembly, integration and installation into wind power tower tube sections prior to erection at the wind farm jobsite so that when the tube sections are erected and connected vertically workers are offered immediate efficient ingress and egress for ascending and descending the wind tower to support construction, set-up, maintenance and emergency response.

Figure 1:
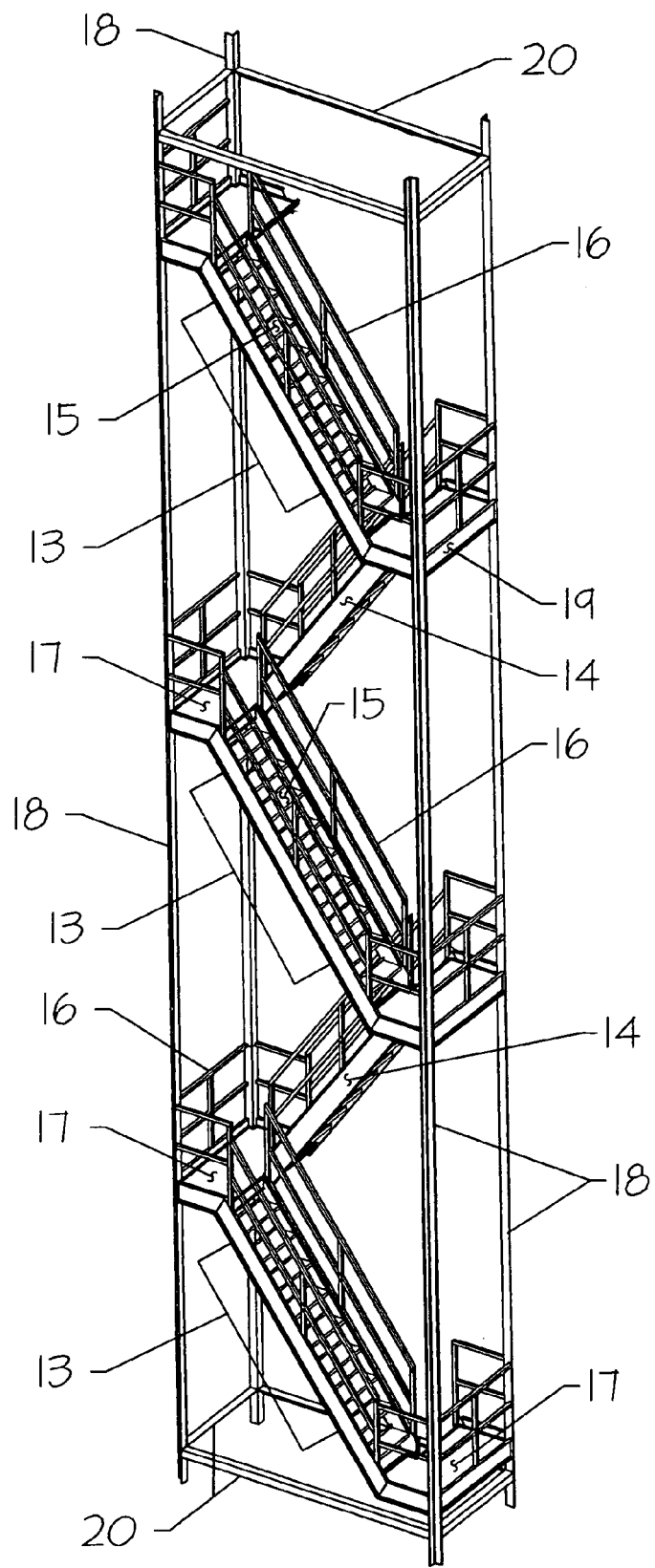
FIG. 1 is an isometric view of a preferred embodiment of a stair tower module in accordance with the present invention.

FIG. 1 shows one embodiment of the present invention, a ship's ladder style stair tower module. A stair tower module FIG. 1 may comprise one or more stairs 13. A stair 13 may comprise one or more stringers 14; one or more stair treads 15 and one or more handrails 16. An intermediate landing 17 is preferably positioned between each stair 13.

A stair tower module FIG. 1 corner hanger 18 serves several functions; it provides the framing to encapsulate the stairs 13, handrails 16 and intermediate landings 17 into a shippable assembly, it serves as an intermediate landing handrail post and it also supports the stair system in it's final vertical position inside the tower. The corner hanger 18 may be an angle or other structural support member that is capable of carrying the required design loads The stair stringers 14 are continuous members from one corner hanger 18 to the opposing corner hanger 18 providing support for the stair treads 15, intermediate landings 17 and handrails 16. Outside stair stringers 14 preferably are processed from plate in a continuous double dogleg configuration including a lower landing, stringer and upper landing also serving as side kick plates at the intermediate landings 17. Inside stair stringers 14 are processed from plate similar to the outside except the lower and upper landing supports are omitted. Stair stringer 14 processing would be performed utilizing computer automated multi-head CNC cutting equipment. Holes necessary for the attachment of stair treads 15; handrails 16 and intermediate landing 17 are cut in during processing utilizing CNC data imported from the shop fabrication drawings.

The stairs' 13 angle of slope or bevel can vary dramatically. Typical ranges are from 52 degrees to 68 degrees on a ship's ladder style stair allowing for a step height or rise of 12 inches making for the fewest allowable number of steps from the top to the bottom of the wind tower.

The stair treads 15 are preferably provided as bent checkered plate, grip strut, bar grating with abrasive nosing or bent plate abrasive surface all fastened, preferably by bolting, to the stair stringer 14 with two bolts at each end with a minimum tread length (stair width) of 24 inches and a tread depth of 6 to 10 inches depending on the project requirements.

The handrails 16 can be fabricated from any suitable material such as standard pipe, square or rectangular tubing, or hot rolled angle depending on the customer's preference. The perimeter handrails 16 are typically fabricated in one piece spanning from corner hanger 18 to the opposing corner hanger 18, bolted to the stair stringer 15 and the intermediate landing support plate 19 allowing for a rigid handrail that braces the stair and provides lateral support to the stair module FIG. 1.

The intermediate landing support plate 19 spans between and is bolted to opposing corner hangers 18 serving to support the checkered floor plate 24 and also serving as the rear kick plate for the intermediate landing 17.

A module support member 20 may be utilized where necessary to stiffen the stair tower module FIG. 1 for shipping and to align module corner hangers 18 for field splicing.

Typically one module FIG. 1 is installed inside each tower tube section 21. Tower tube sections 21 can be of any length but typically range from approx. 20-feet to 80-feet or more with 60 feet being the most common length. When the tower tube sections 21 exceed 60-feet long two stair tower modules FIG. 1 may be utilized to make up the entire length of the tube section 21. For example, an 80-foot long tower tube section 21 might have two 40-foot long stair tower modules FIG. 1 mounted inside.

The stair tower module FIG. 1 components can be manufactured utilizing several different materials. The preferred materials of construction include hot dipped galvanized steel, mill-finished aluminum or mill-finished stainless steel depending on project conditions. These materials offer low maintenance and should be considered when specifying for off shore or land based wind farms. However, there are many other suitable materials that are well known in the art that may suffice for materials of construction.

FIG. 2 shows a plan view of a permanent work platform 22 located just below the tower tube section's 21 top splice joint allowing workers a level landing from which they can attach the next tube section 21 vertically. The work platforms 22 are also utilized for joint inspection, rest platforms, equipment and work stations.

FIG. 3 shows the approximate location of the work platform 22 with its channel support framing 23 that is shipped loose with the stair tower module FIG. 1 to be installed into the wind power tower tube section 21 along with the checkered floor plate 24 that make up the work platform 22. The checkered floor plate 24 at the work platform 22 is commonly provided in aluminum to reduce weight and make installation inside the tower tube section easier.

FIG. 4 shows the approximate location of the module attachment channels 25. The module attachment channels 25 are shipped loose for attaching the stair tower module FIG. 1 to the inside of the tower tube section 21 by fastening, preferably by bolting, to the corner hangers 18 then fastening to the tower wall through a fastening plates 26 at each end. Any changes in tube diameter as the system travels higher in the tower would be addressed by shortening the module attachment channels 25 to accommodate the transition. The stair tower module system requires significantly fewer attachment locations than the open ladder with a fall arrest or electric lift systems.

Figure 5:
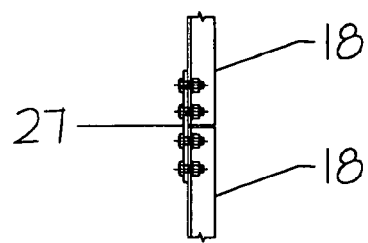
FIG. 5 is side sectional elevation view of the stair tower module slice detail connecting adjacent modules together vertically.

FIG. 5 shows how the angle corner hangers 18 of stacked stair tower modules FIG. 1 are preferably bolted together utilizing a splice plate 27 on both outstanding legs with structural grade bolts.

Figure 6:
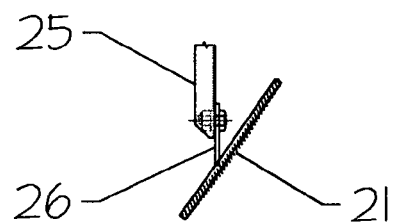
FIG. 6 is a top sectional view of the end of a channel support header connection to the inside a wind tower tube.

FIG. 6 illustrates a preferred method of connecting a module attachment channel 25 to the inside of the tower tube section 21 utilizing a fastening plate 26 welded to the inside face of the tower wall.

Figure 7:
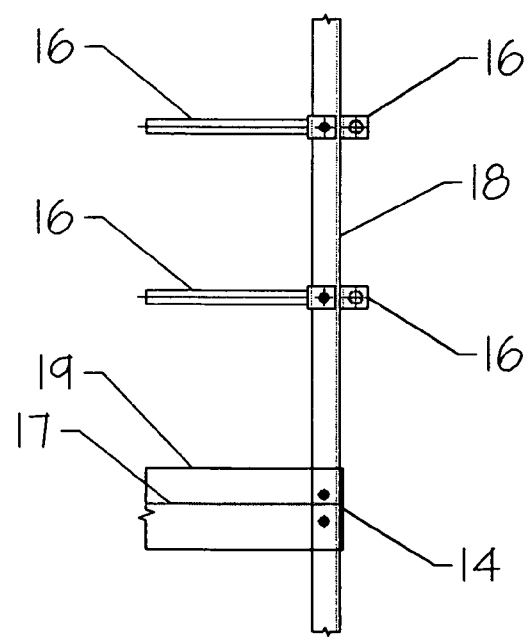
FIG. 7 is a partial elevation view of the stair tower module hanger serving as module perimeter, handrail post and stair framing hanger support.

FIG. 7 illustrates a corner hanger 18 serving as the perimeter module framing, intermediate, landing handrail post and stair framing support.

Figure 8:
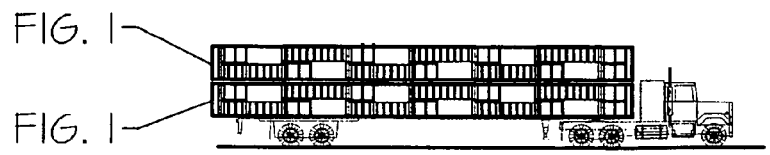
FIG. 8 is a side elevation view illustrating two stair tower modules loaded on a truck.

FIG. 8 is a side elevation view illustrating multiple modules of the present invention loaded on a truck for delivery to the wind tower tube location.

Figure 9:
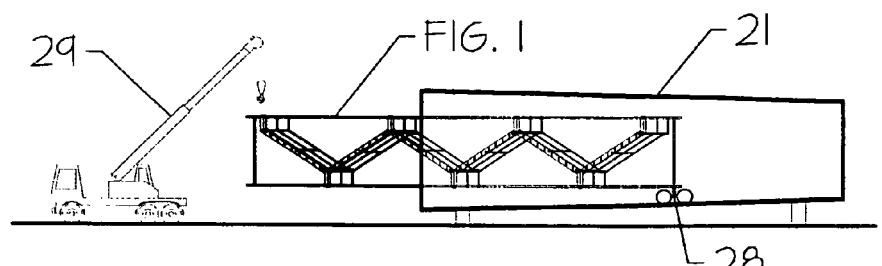
FIG. 9 is a side partially hidden elevation view illustrating the stair tower module being slipped inside a wind tower tube section.

FIG. 9 is a partially hidden elevation showing that the present invention can be inserted inside a wind tower tube section 21 utilizing a rubber wheeled dolly 28 mounted to the front leading edge of the stair tower module FIG. 1 supported by an appropriately suited mobile crane 29. Once the module FIG. 1 is in the correct location the module attachment channels 25 are fastened to the corner hangers 18 locating the fastening plates 26 at each end so that they can be attached to the face of the tube wall preferably as shown in FIG. 6.

Figure 10:
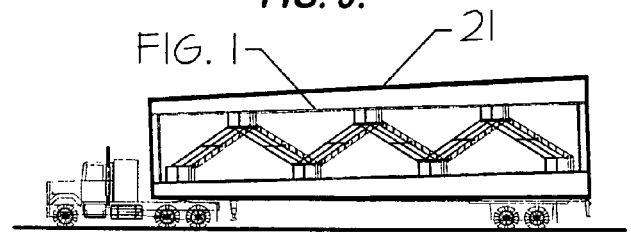
FIG. 10 is a side hidden elevation view illustrating a wind power tower tube section being shipped to the wind farm jobsite with the stair tower module mounted inside.

FIG. 10 illustrates a wind tower tube section 21 ready for shipment to the wind farm site with the stair tower module FIG. 1 of the present invention mounted inside. Because the stair tower module FIG. 1 is contained within the tower tube section 21 additional freight cost for the stair tower module FIG. 1 is minimized. Wind tower tube sections 21 are typically shipped via tractor-trailer truck, railcar or ocean going barges.

Figure 11:
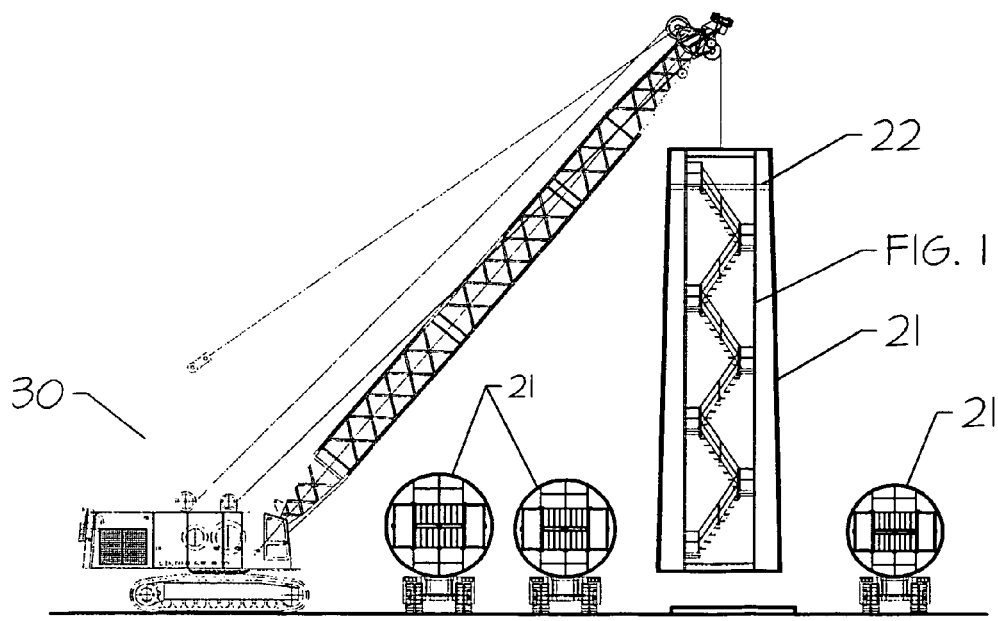
FIG. 11 is a side hidden elevation view illustrating a wind power tower tube being set at the project site with the stair tower module mounted inside available for immediate use.

FIG. 11 illustrates a wind tower tube section being set at the jobsite by an appropriately suited track crane 30 with the stair tower module FIG. 1 mounted inside ready for immediate access to construction crews and other authorized personnel. Additional tube sections can be made available to the erection crew to facilitate the attachment of the next tower tube section 21 as well as other equipment that is attached to the top tube section.

Figure 12:
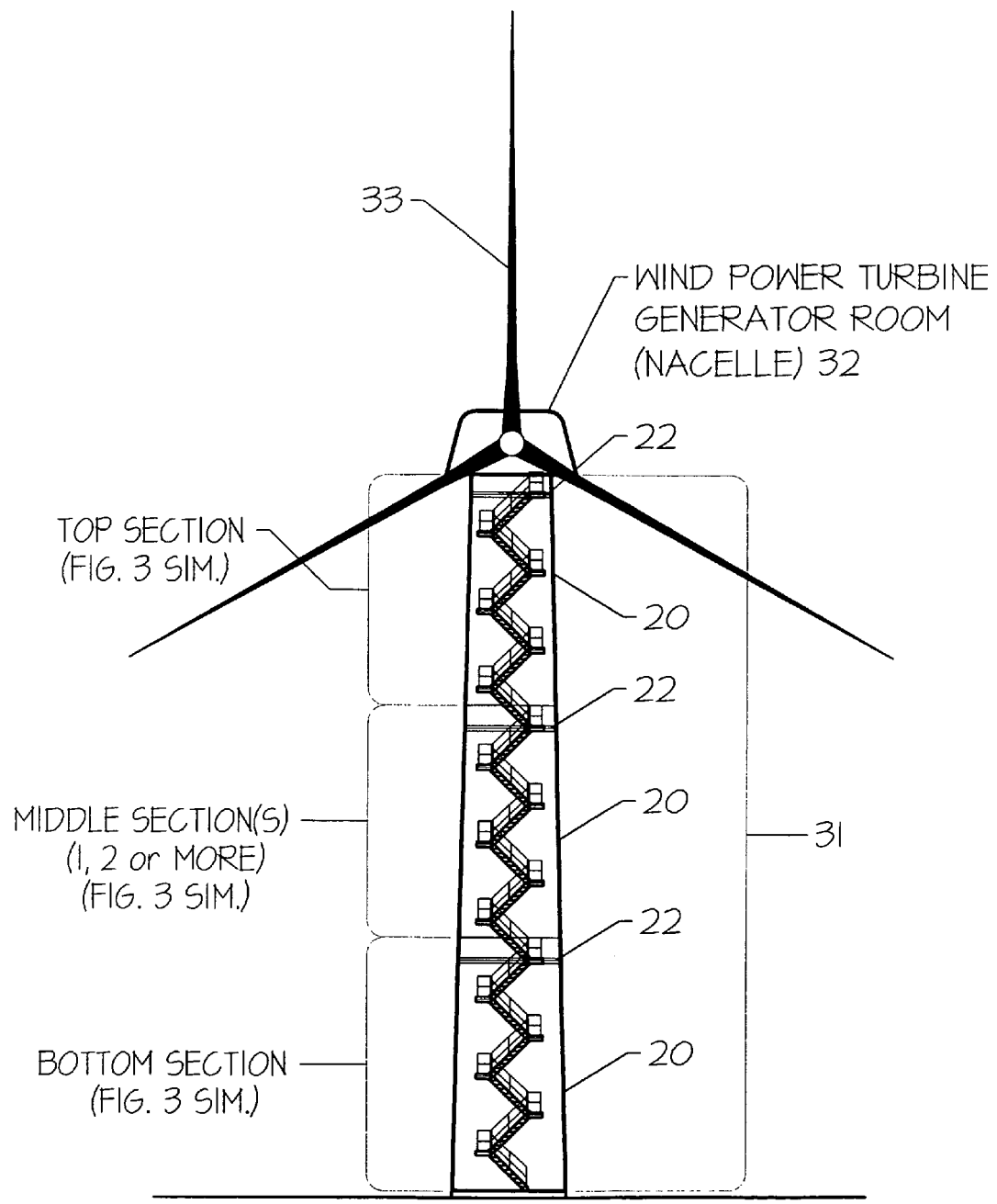
FIG. 12 is a hidden elevation view of a wind power tower with a nacelle and rotating blades mounted on top consisting of numerous tube sections each with a stair tower module mounted inside.

FIG. 12 shows a hidden elevation view of a wind tower 31 with a nacelle 32 and its rotating blades 33 mounted on top. In this illustration a complete preferred embodiment of the present invention comprising a plurality of stair tower modules FIG. 1 connected end to end and stacked vertically through the entire length of the wind tower 31 providing contiguous stair ingress and egress for construction crews and technical personnel to enhance the efficiency of tower erection, equipment installation, monitoring, system modification, repair and maintenance through the entire service life of the tower.

While a ship's ladder style stair is depicted in FIG. 12 as traveling all the way to the top platform level of the tower, a number of different configurations of stairs or ladders can be utilized to accomplish the same objectives of the present invention.

Figure 13:
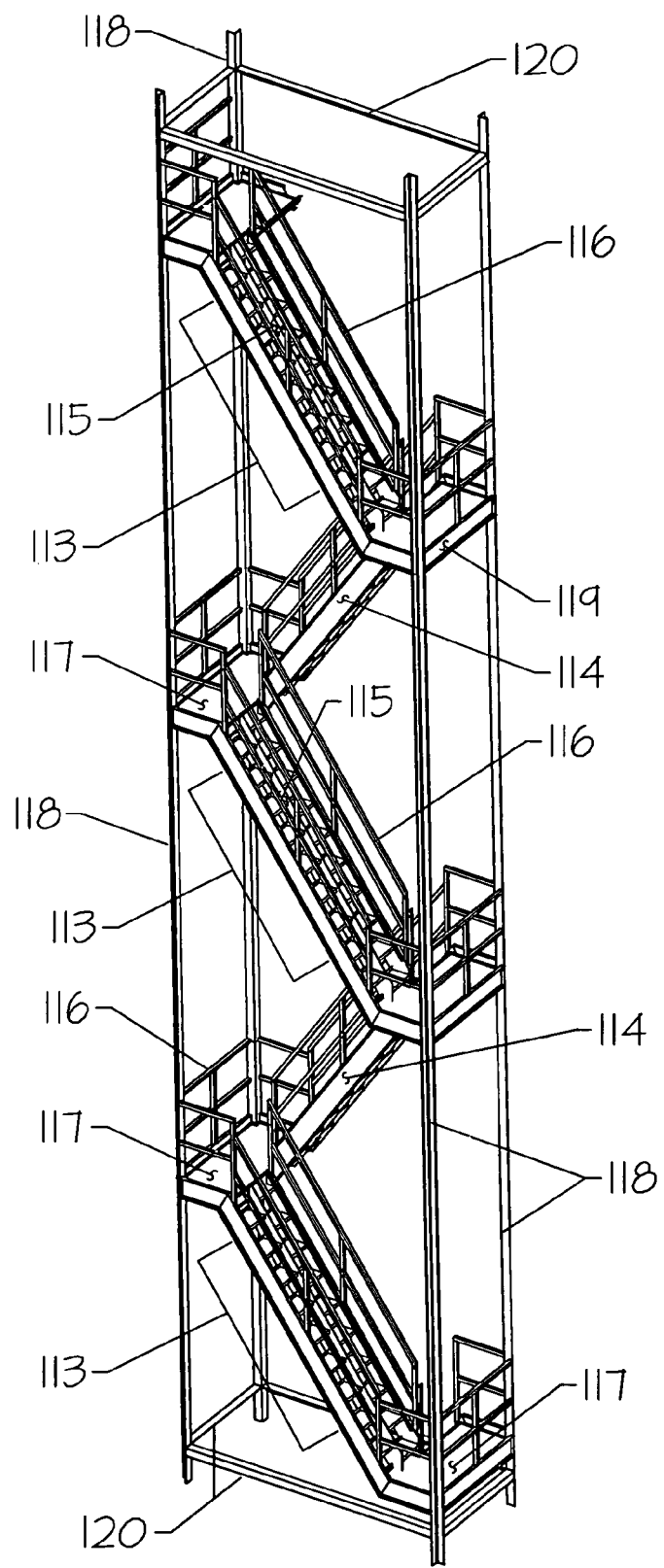
FIG. 13 illustrates a perspective view of a second embodiment of the present invention.
Figure 17:
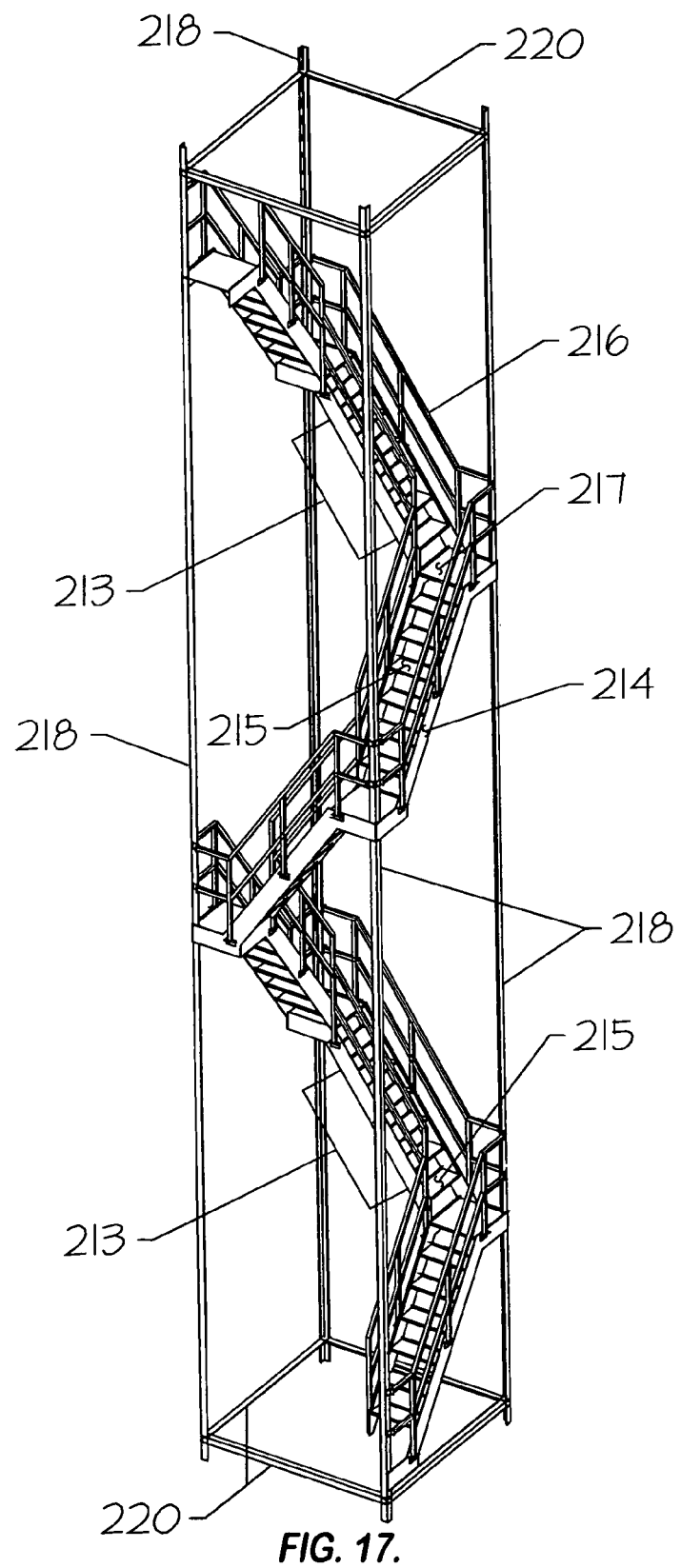
FIG. 17 illustrates a perspective view of a third embodiment of the present invention.

In FIGS. 13-15, alternating treads 115 are illustrated. As the name implies the treads alternate to accommodate the actual motion of climbing steps. In this alternate embodiment, the treads 115 are supported by outside, central and inside stringers 114. The handrails 116, intermediate landings 117, corner hangers 118, intermediate landing support plate 119, module support member 120, work platform 122, support framing 123, checkered floor plate 124 and module attachment channel 125 are identical in description to the like-named elements in the first described embodiment.

Figures 18, 19, 20:
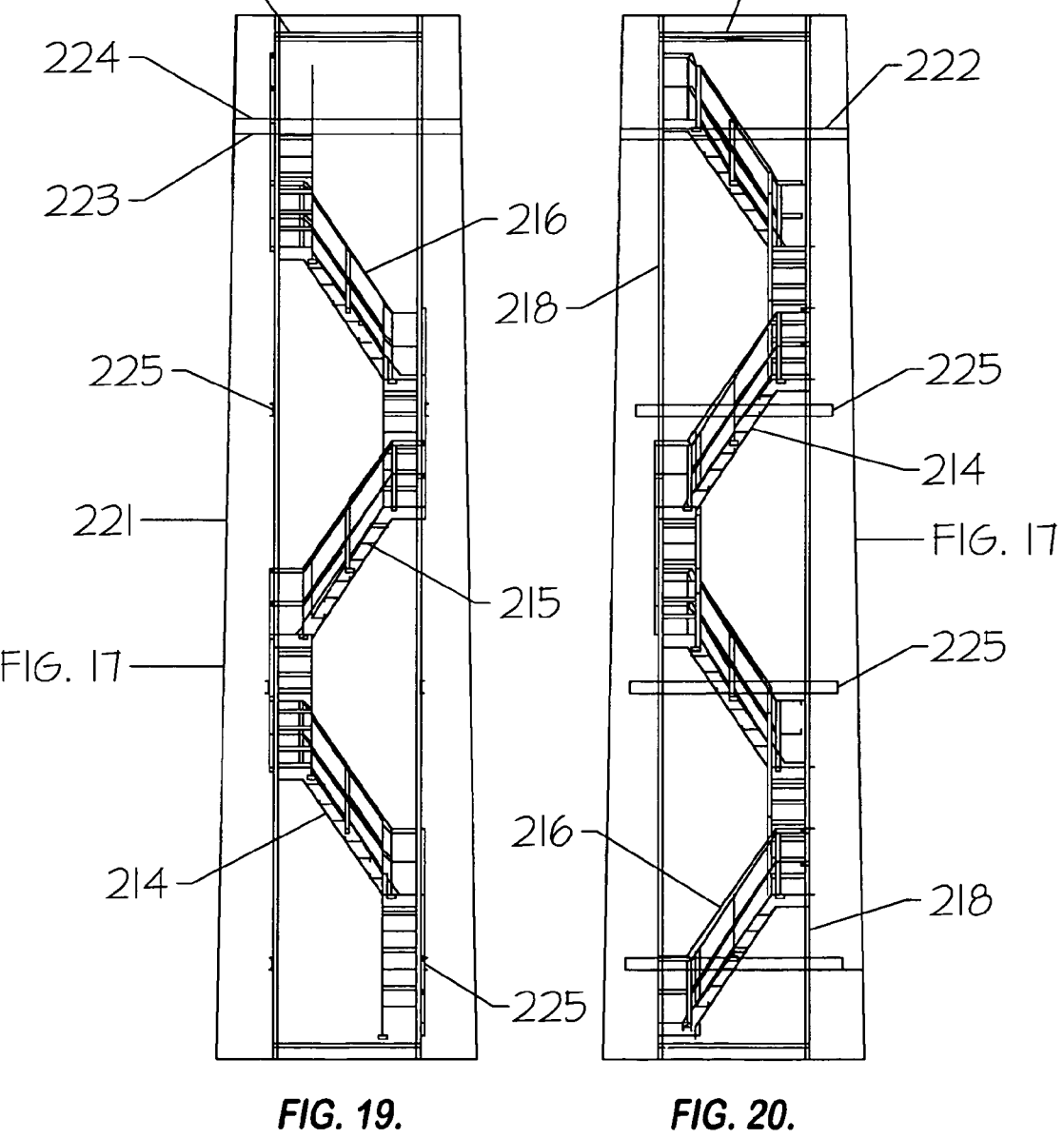
FIG. 18 is a top view of the embodiment shown in FIG. 17.
FIG. 19 is a right side view of the embodiment shown in FIG. 17, the left side view being a mirror image thereof.
FIG. 20 is an end view of the embodiment shown in FIG. 17.
Figure 21:
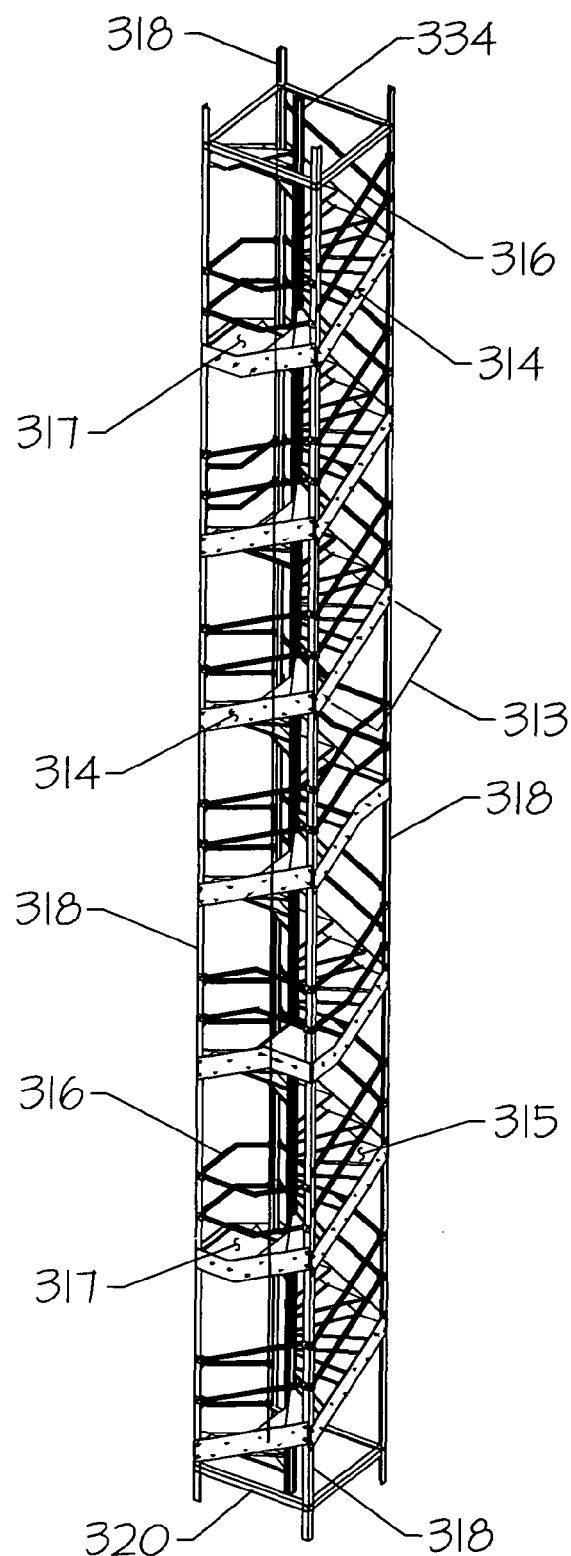
FIG. 21 illustrates a perspective view of a fourth embodiment of the present invention.
Figure 22:
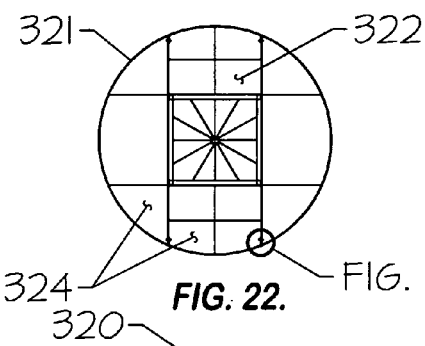
FIG. 22 is a top view of the embodiment shown in FIG. 21.
Figure 23:
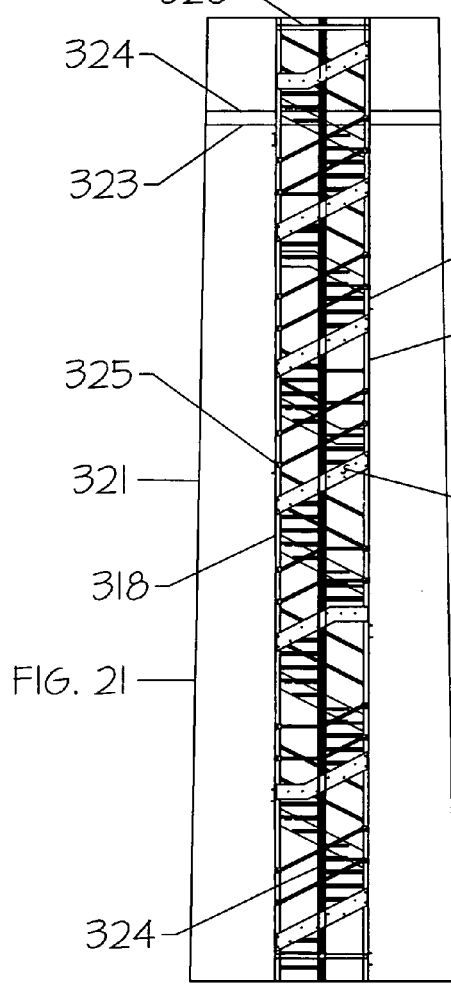
FIG. 23 is a right side view of the embodiment shown in FIG. 21, the left side view being a mirror image thereof.
Figure 24:
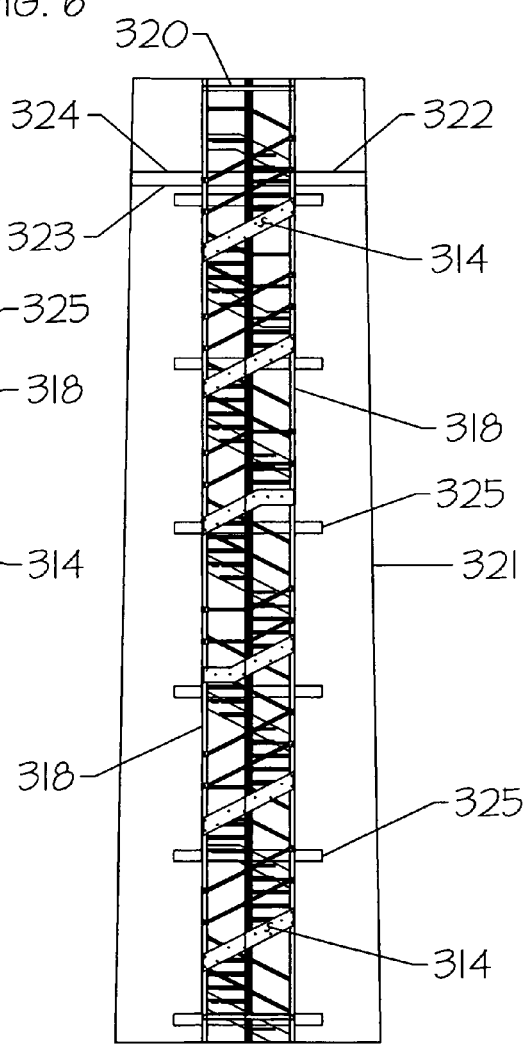
FIG. 24 is an end view of the embodiment shown in FIG. 21.
Figure 25:
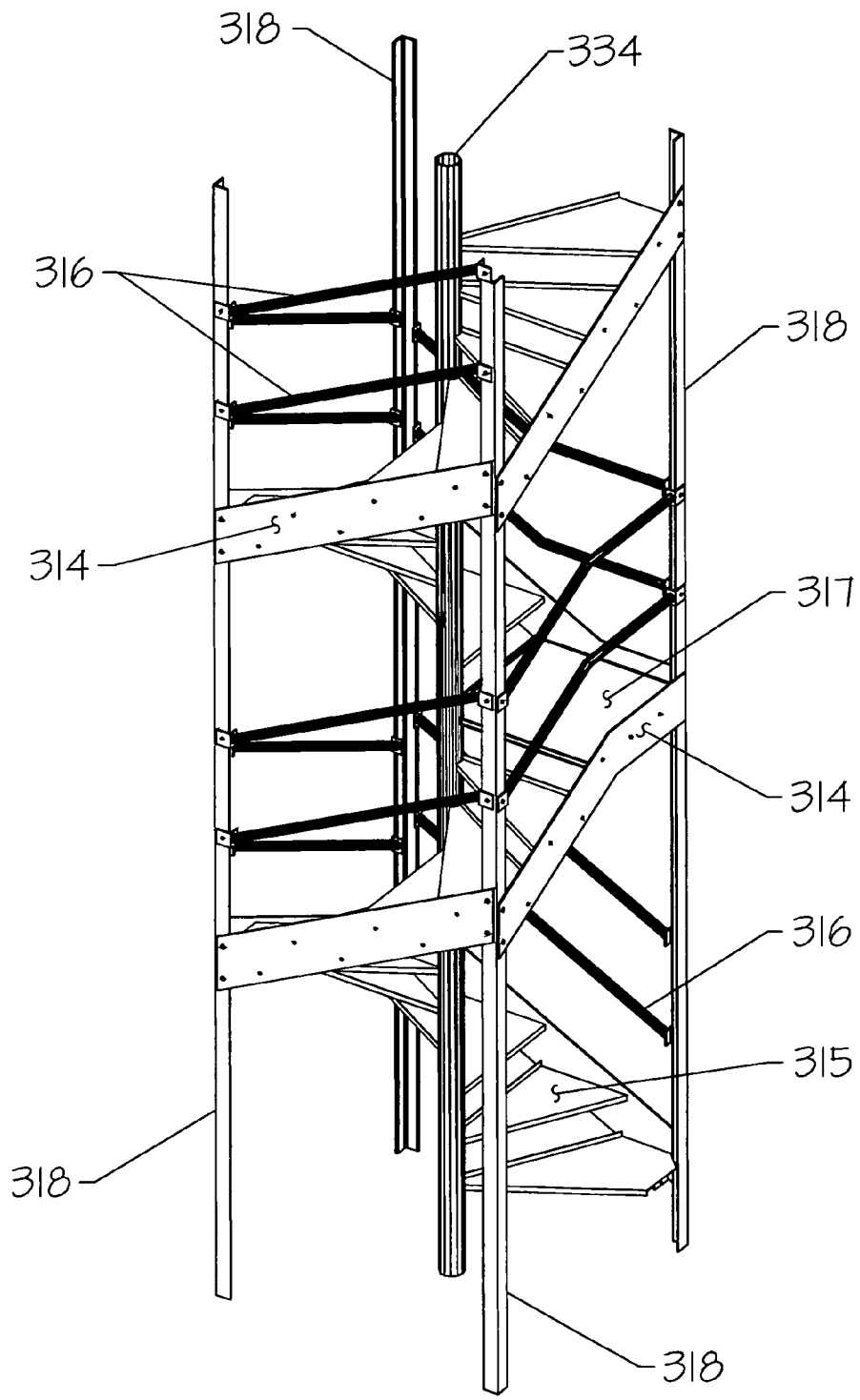
FIG. 25 is a perspective view of a portion of the stair tower shown in FIG. 21 to show more detail of the boxed spiral stair configuration.
Figure 26:
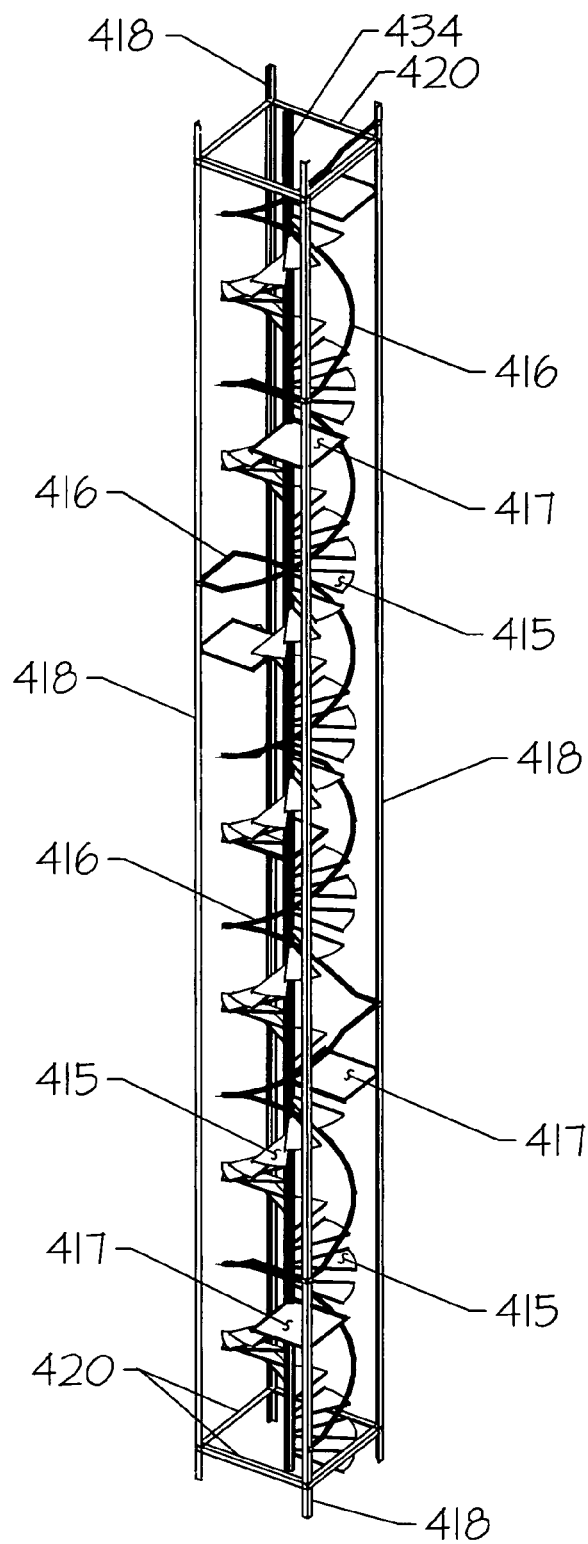
FIG. 26 illustrates a perspective view of a fifth embodiment of the present invention.
Figure 30:
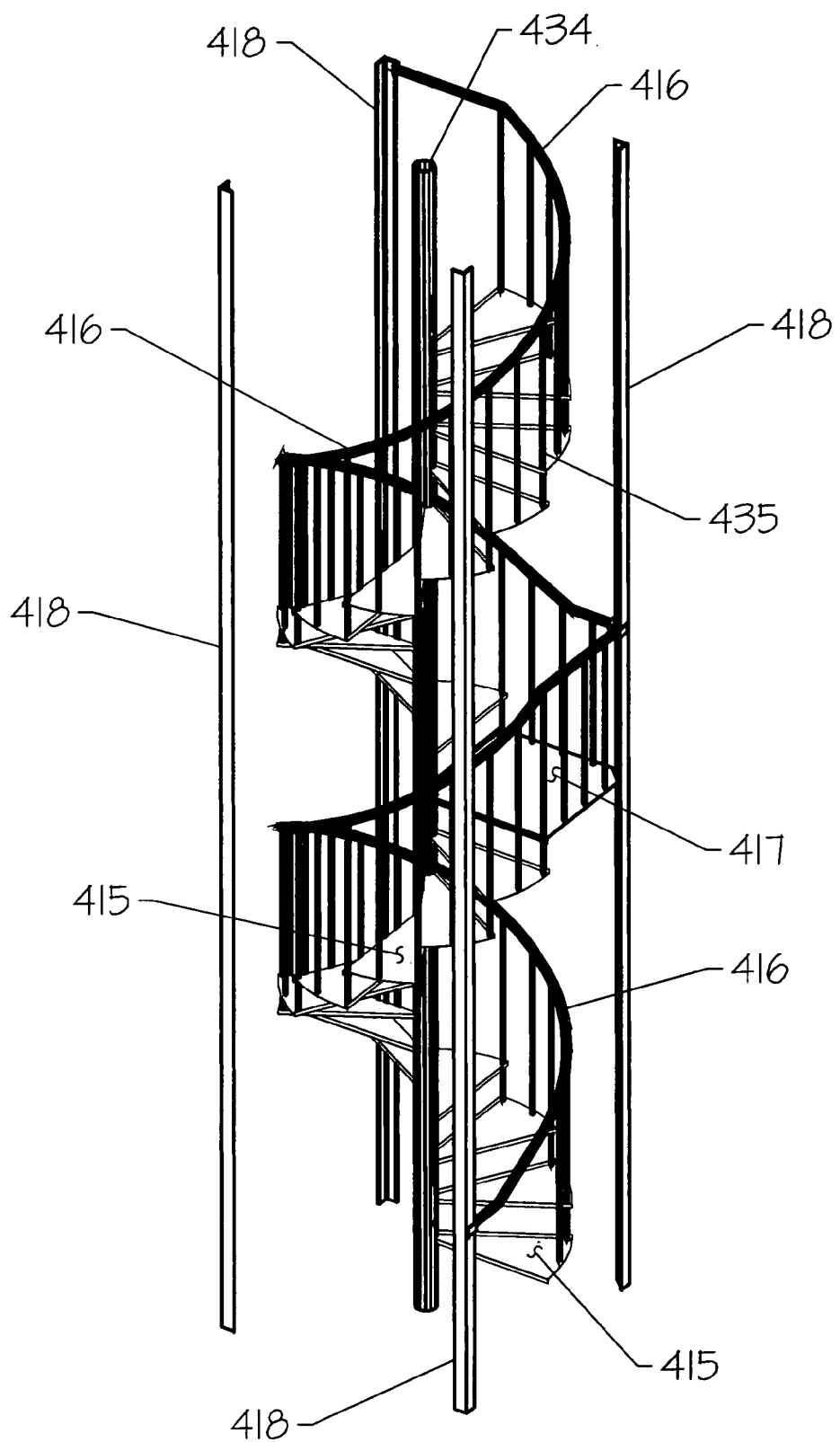
FIG. 30 is a perspective view of a portion of the stair tower shown in FIG. 26 to show more detail of the spiral stair configuration.
Figure 31:
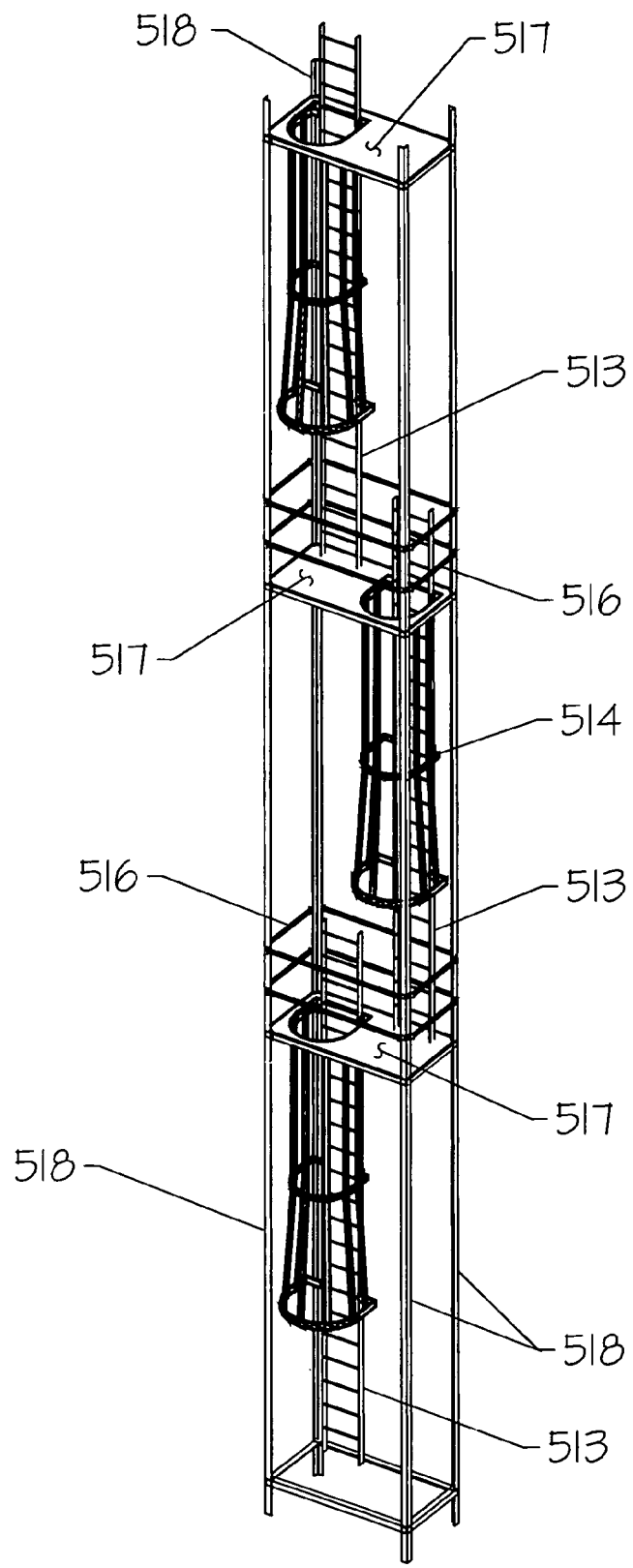
FIG. 31 illustrates a perspective view of a fifth embodiment of the present invention.
Figure 32:
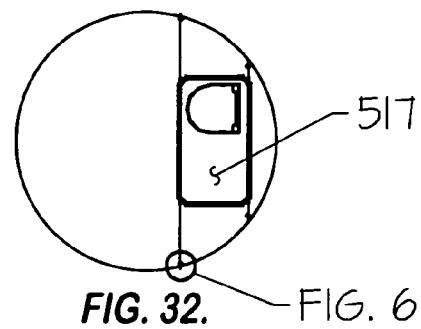
FIG. 32 is a top view of the embodiment shown in FIG. 31.
Figures 33, 34:
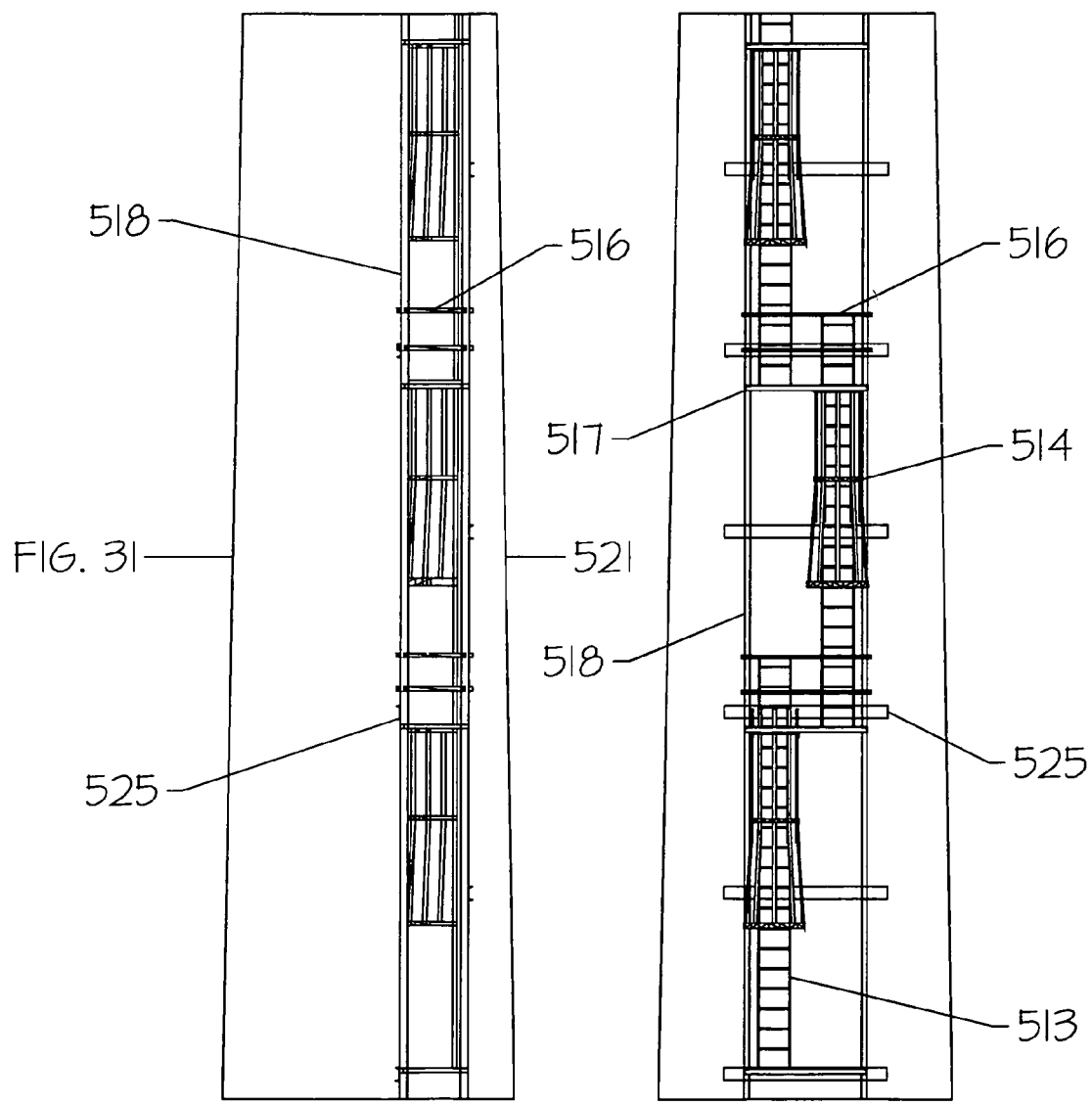
FIG. 33 is a right side view of the embodiment shown in FIG. 31, the left side view being a mirror image thereof.
FIG. 34 is an end view of the embodiment shown in FIG. 31.

In FIGS. 17-20, a box stair style is shown. Basically, this style of stair takes right angle turns at the landings instead of 180 degree turns. In this alternate embodiment, the treads 215 are supported by and outside and inside stringers 214. The handrails 216, intermediate landings 217, corner hangers 218, intermediate landing support plate 219, module support member 220, work platform 222, support framing 223, checkered floor plate 224 and module attachment channel 225 are identical in description to the like-named elements in the first described embodiment. As shown in FIG. 18, the advantage of a box stair is that the central portion of the wind tower remains open to accommodate a lift or other similar device.

In FIGS. 21-25, a box spiral stair style is shown. Like the name this style of stair spirals upwards supported by a corner members 318 and central support member 334. The central support member 334 serves as the inner "stringer" for all the treads 315. The outer stringer 314 spans between and is attached to the corner members 318 to support the treads 315. Rather than the outer edge of each tread 315 being rounded, it is typically fabricated with a straight edge to attach to the stringer 314. Intermediate landings 317 can be positioned at various elevations along the stair case. The handrails 316 are fastened to the corner support members 318. Module support member 320, work platform 322, support framing 223, checkered floor plate 224 and module attachment channel 225 are identical in description to the like-named elements in the first described embodiment.

In FIGS. 26-30 a typical spiral stair style is shown. Like the name this style of stair spirals upwards supported by a corner members 418 and central support member 434. The central support member 434 serves as the inner "stringer" for all the treads 415. The handrails 416 are fastened to the corner support members 418 usually that the location of intermediate landings 417. Rather than an outer stringer to support the treads 415, balusters 435 extend from the handrails 416 and are attached to the treads 415. Module support member 420, work platform 422, support framing 423, checkered floor plate 424 and module attachment channel 425 are identical in description to the like-named elements in the first described embodiment.

As illustrated in FIGS. 31-34, the stair tower of the present invention allows a ladder type climbing system to be installed. Ladders 513 extend to intermediate platforms 517. Cages 514 surround a portion of the ladder 513 to accommodate safety codes.

Although specific configurations of the stair tower module have been depicted herein, the geometric orientation, materials of construction, methods of fastening, stair type, slope, number of stairs, treads, landings or hangers may vary to meet project requirements.

As the present invention may be embodied in several different forms without departing from the essential characteristics or benefits thereof and the illustrations and descriptions are therefore illustrative and not restrictive.

I claim:

1. A first prefabricated stair tower module installed inside a wind tower, said wind tower having a plurality of first connection points, said first prefabricated stair tower module comprising:
   a. At least one preassembled ships style stair, said ships style stair having an angle of slope ranging from about 52 degrees to about 68 degrees, comprising;
   b. At least one stair stringer;
   c. A plurality of stair treads, each stair tread being supported by the stair stringer;
   d. Each stair tread being oriented relative to the stringer and to every other tread to comprise rising steps;
   e. An upper landing attached to the upper end of the stringer, said landing having a substantially flat surface, the upper landing for connecting to a second prefabricated stair within the first prefabricated stair tower module;
   f. A plurality of support members structurally connected to the upper landing, said support members having a plurality of second connection points whereby the second connection points cooperate with the first connection points and connect the first prefabricated stair tower module to the inside of the wind tower.

2. The first prefabricated stair tower module of claim 1 further comprising an additional stair stringer, the additional stair stringer being parallel to the at least one stair stringer and further supporting the stair treads.

3. The first prefabricated stair tower module of claim 1 where the plurality of support members comprises a first upwardly extended corner brace structurally connected to the upper landing.

4. The first prefabricated stair tower module of claim 1 further comprising at least one hand rail connected to the stair tower module and spanning between the upper landing and the lowest step.

5. The first prefabricated stair tower module of claim 1, further comprising a second prefabricated stair, said second stair having an angle of slope ranging from about 52 degrees to about 68 degrees, said second stair comprising steps leading to a second landing, said second prefabricated stair being connected to the upper landing, and positioned relative to the first prefabricated stair so that the first step of the second prefabricated stair leads upward from the first prefabricated stair and in a different direction from the upper step of the first prefabricated stair.

6. The stair tower module of claim 5 further comprising at least one hand rail connected to the stair tower module and extending along the steps of the first stair tower module, the perimeter of the upper landing and the steps of the second prefabricated stair.

7. The first prefabricated stair tower module of claim 2, further comprising a second prefabricated stair, said second stair having an angle of slope ranging from about 52 degrees to about 68 degrees, said second stair having at least two parallel stringers, said second prefabricated stair comprising steps leading to a second landing, said second prefabricated stair being connected to the upper landing, and positioned relative to the first prefabricated stair so that the first steps of the second prefabricated stair leads upward from the first prefabricated stair and in a different direction from the upper step of the first prefabricated stair.

8. The stair tower module of claim 7 further comprising at least one hand rail connected to the stair tower module and extending along the steps of the first prefabricated stair, and further extending along the perimeter of the upper landing and the steps of the second prefabricated stair.

9. The prefabricated stair tower module of claim 8 wherein the second prefabricated stair and the first prefabricated stair are both connected to the same side of the landing.

10. The prefabricated stair tower module of claim 9 wherein the landing is larger in size than a step.

11. The prefabricated stair tower module of claim 10 wherein the second prefabricated stair extends upward from the landing at an angle, and in a direction that is 90 degrees from the direction of the first prefabricated stair.

12. The prefabricated stair tower module of claim 11 wherein the steps are connected to the stringers by welds.

13. The prefabricated stair tower module of claim 12 wherein there are four support members each support member located at an outer corner of the prefabricated stair tower module.

14. The prefabricated stair tower module of claim 13 wherein the second connection points of the support members are connected to the corresponding first connection points of the wind tower by bolting.

15. The prefabricated stair tower module of claim 14 wherein the material of construction of the stair tower module is aluminum.

16. The prefabricated stair tower module of claim 15 further comprising a second hand rail located on the side of the steps opposite the at least one handrail.

* * * * *